United States Patent [19]

Lebreux

[11] Patent Number: 5,046,255

[45] Date of Patent: Sep. 10, 1991

[54] AIR DEFLECTOR FOR CIRCULAR SAW

[76] Inventor: Michel F. Lebreux, 8595, Pierre Boucher, St-Francois, Laval, Quebec H7A 1X5, Canada

[21] Appl. No.: 441,292

[22] Filed: Nov. 27, 1989

[51] Int. Cl.⁵ ............................................. B23D 45/16
[52] U.S. Cl. ..................................... 30/390; 30/391; 30/286
[58] Field of Search .................. 30/390, 388, 374–377, 30/391, 386; 83/56, 100

[56] References Cited

U.S. PATENT DOCUMENTS 3,662,796  5/1972  Batistelli .............................. 30/390
4,450,627  5/1984  Morimoto ............................. 30/391

Primary Examiner—Timothy V. Eley
Attorney, Agent, or Firm—Roland L. Morneau

[57] ABSTRACT

A device for deflecting air produced by the rotating blade of a circular saw in the direction of the front of the blade for dispersing sawdust accumulated in front of the kerf. The device comprises a lamella adjacent the side of the blade adapted to deflect the air through an aperture in the blade protector. A roof shape member located in front of the aperture deflect the incoming air downwardly to produce a flow of air in front of the blade over the board to be cut.

12 Claims, 2 Drawing Sheets

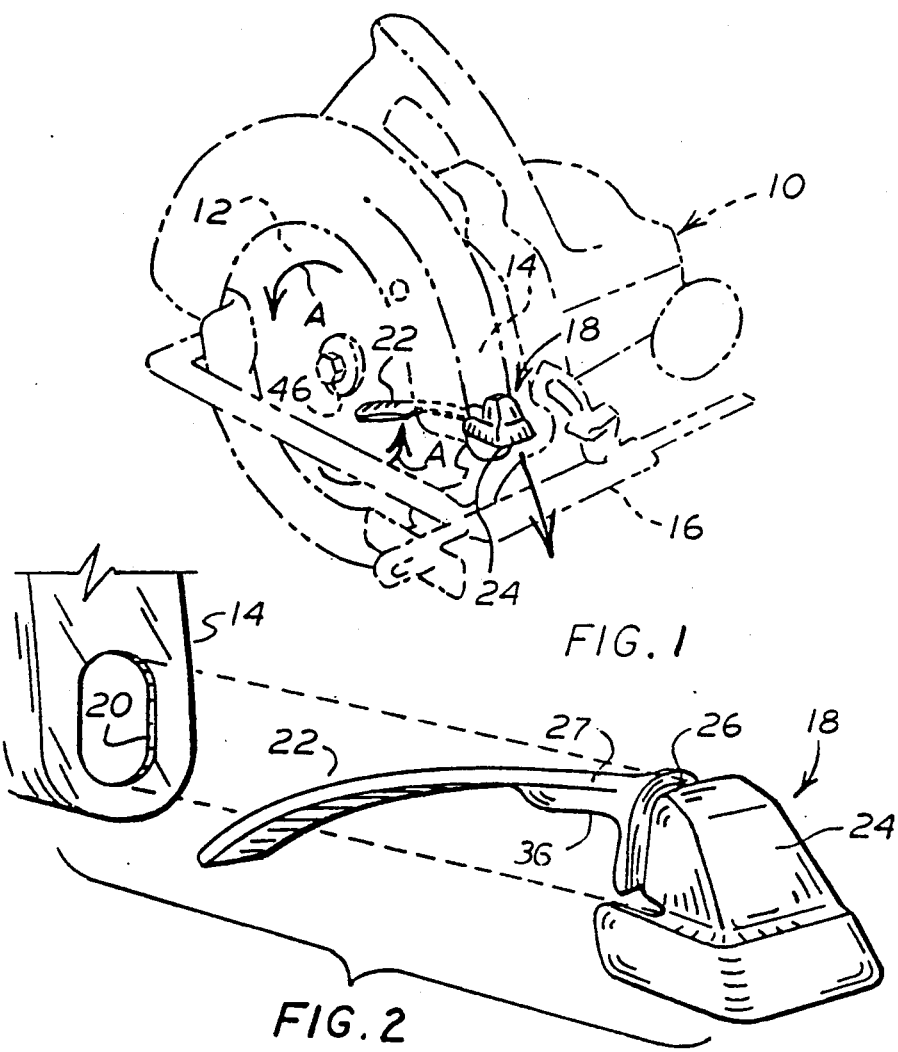
FIG. 1
FIG. 2
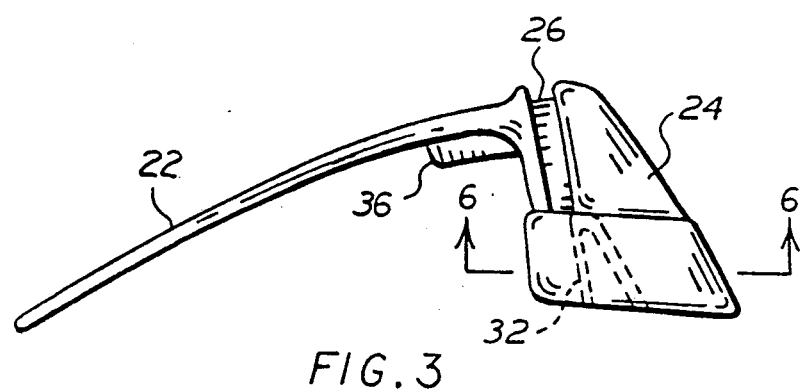
FIG. 3

AIR DEFLECTOR FOR CIRCULAR SAW

BACKGROUND OF THE INVENTION

1. Field of the Invention

The present invention relates to a device to be mounted on a circular saw for blowing air on the front trajectory of a rotating circular saw blade to disperse the accumulated sawdust. The device also stops a large portion of the sawdust which usually reach the face of the operator.

2. Prior Art

No prior art is known by the applicant to make use of the air flow caused by the rotation of a circular saw blade for dispersing sawdust away from the portion of the cutting line in front of the blade.

SUMMARY OF THE INVENTION

The device is a deflector adapted to be mounted through an aperture provided in a blade protector of a circular saw blade. The deflector comprises a lamella for channeling the air rotating adjacent the rotating blade in a forward direction through the aperture and an arched roof member located in front of the aperture for downwardly directing the channelled air towards the front working portion of the blade. An annular member connects the lamella to the arched roof member and is adapted to tightly fit in the aperture of the blade protector. The arched roof member has two lateral walls abutting against the blade protector for stabilizing the deflector against the blade deflector.

The deflector according to the invention may also be an integral part of the circular saw and in particular of the blade protector.

BRIEF DESCRIPTION OF THE DRAWING

FIG. 1 is an isometric view of an air deflector according to the invention mounted on a schematic illustrated circular saw;

FIG. 2 is an isometric view of the air deflector separated from the saw blade protector of the circular saw;

FIG. 3 is a side plan view of the air deflector shown in FIG. 2;

DETAILED DESCRIPTION OF THE INVENTION

Figure 4:
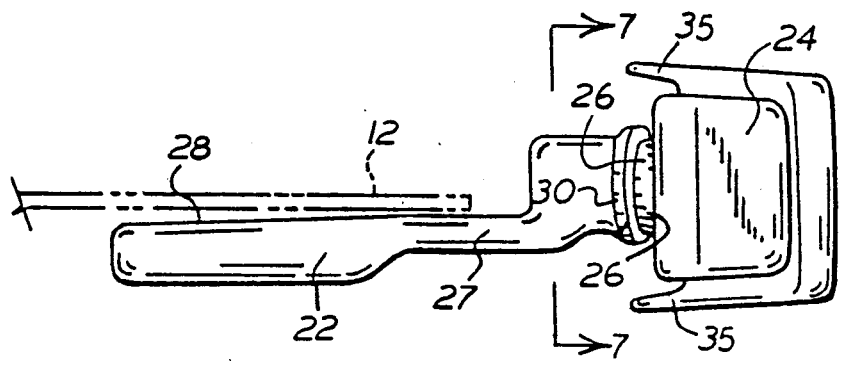
FIG. 4 is a top plan view of the deflector shown in FIG. 3.
Figure 5:
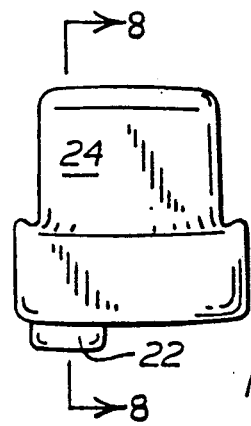
FIG. 5 is a front view of the deflector.
Figure 7:
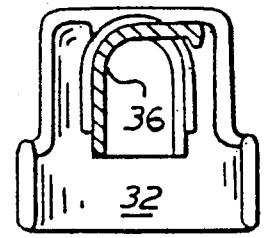
FIG. 7 is a cross-sectional view of the deflector along line 7—7 of FIG. 4.
Figure 6:
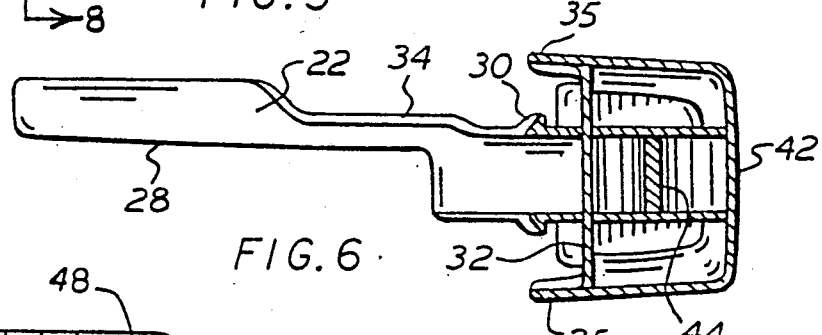
FIG. 6 is a cross-sectional view of the deflector along line 6—6 of FIG. 3.

FIG. 1 schematically illustrates a standard circular saw 10 having a circular blade 12 partly covered by a blade protector 14 over the upper surface of the blade and extending towards the front of the blade. The circular saw 10 is also provided with a front guard 16. The air deflector 18 according to the invention is mounted on the blade protector 14 through an aperture 20 provided in the blade protector 14 as illustrated in FIG. 2.

The air deflector 18 comprises a lamella 22, an arch-roof member 24 and an annular member 26 connecting the lamella 22 to the arch-roof member 24.

For its operation, the lamella 22 is introduced into the aperture 20 to position the side 28 of the lamella 22 along the outer side of the circular blade 12 as particularly illustrated in FIG. 4. The annular portion 26 is adapted to hold into the aperture 20 while the roof member 24 abuts against the front surface of the blade protector 14.

The air deflector 18 operates as follows. When the circular blade 12 rotates in the direction of the arrows A, the resultant flow of air which circulates in the same direction around the periphery and adjacent the side of the blade 12, is partly picked up by the lamella 22 and is projected in the direction of the opening 20 of the blade protector 14. The air which passes through the opening 20 is further projected inside the arch-roof member 24 which is oriented to deflect the air downwardly in front of the blade 12, that is, in the direction of the projected kerf. It is well known that sawdust accumulates on the board to be cut when the blade is in rotation. This sawdust obstructs the view of the operator and particularly in the direction where the blade needs to be guided. This direction is frequently identified by a line traced with a pencil and the sawdust obstructs the sight of that line. The purpose of the present air deflector is to project a constant flow of air in the direction of the board which needs to be free of sawdust so that the operator can guide the circular saw in the desired direction. It has been found that the present device is extremely efficient for that purpose.

The lamella 22 has a lateral ledge 34 extending downwardly along a portion of the lamella 22 on the side opposite the blade 12. The ledge 34 serves as an air guiding member towards the aperture 20.

It is also a known fact that a certain amount of sawdust is picked up by the blade and projected in the direction of the upwardly directed arrow A. A certain amount of this sawdust which is projected upwardly is not completely shielded by the blade protector 14. The sawdust which is accordingly projected upwardly, quite frequently reaches the face and particularly the eyes of the operator. It has been found that the lamella 22 picks up a large amount of that unwanted sawdust and prevents if from reaching the face of the operator of the circular saw 10.

Although the present air deflector 18 is contemplated as a distinct device from the circular saw it should be obvious that the air deflector can be integrally produced with the blade protector 14 according to the present invention.

In order to ascertain an easy introduction and a firm retention of the deflector 18 in the aperture 20, the latter preferably has a vertically elongated shape. The lamella 22 is introduced sideways that is, in a vertical position. This allows the lamella to be wider at its end remote from the roof member 24 so as to more completely shield the face of the operator from the sawdust. The lamella 22 has a restricted portion 27 to allow the air deflector to rotate into the opening 20 during the installation procedure and to return to its normal horizontal position as shown in FIGS. 1 and 2. The air deflector is subsequently pushed further into the opening 20 so that the wall of the blade protector 14 surrounding the aperture 20 can clip or snap into the annular member 26 after having overriden the protuberance 30. The protuberance 30 surrounds at least in part the annular member 26 and is distant from the abutting rear wall 32 so that the portion of the blade protector surrounding the aperture 20 is firmly squeezed from both sides in a groove over the annular member 26. The restricted portion 27 of the lamella 22 is reinforced with the ledge 34 against flection caused by the air flow.

Two wing members 35, laterally extending rearwardly on each side of the roof shape member 24 are sufficiently long to overlap the sides of the blade protector 14. These wing members 35 laterally support the air deflector 18 and hinders its rotation in the aperture 20. The wing members 35 are preferably taper, as shown in FIG. 4, with a slight angle relative to the longitudinal axis of the air deflector. They are adapted to squeeze the sides of the blade protector 14 even if the latter has a slight difference in width from one model of circular saw to another.

The annular member 26 also comprises a connecting part 36 which connects the lamella 22 to the roof shape member 24. Connecting part 36 has a right-angular shape wherein one side extends from the plane of the lamella 22 and the other side bodily integrates with the roof-shape member 24. The L-shaped member 36 leaves open two sides of the annular member 26, i.e. the bottom and the front side.

The dimension of the L-shaped member 36 and the groove in the annular member 26 are such as to allow the rotation and the insertion of the air deflector 18 in the aperture 20.

The angle of the lamella 22 is preferably set so as to cross the raduis 38 extending from the center 40 of the circular blade 12 to a central region of the aperture 20. Such an angle favors the flow of air, adjacent the balde 12 during its rotation to be projected in the desired direction. The roof wall 42 is also provided with an angle suitable to project the air in front of the kerf adjacent the blade. In order to more specifically channel the air, and internal wall 44 is added. This wall allows the flow of air to be directed forwardly of the plane of the blade protector 14 and be more specifically focused in the desired direction.

The blade 12 of the circular saw needs to be removed at times whether it is for sharpening or for substituting a different type of blade. This is done by removing the nut 46 and by pulling the blade 12 away from the circular saw 10. In the circumstances, the lamella 22 may hinder this operation if the latter runs along too closely to the blade. In order to facilitate this operation without removing the air deflector, the lamella 22 is made slightly taper towards the end away from the roof member 24. The tapering of the width of the lamella 22 along the side 28 is usually sufficient to allow the blade 12 to be removed without the need of removing the air deflector 18.

Figure 9:
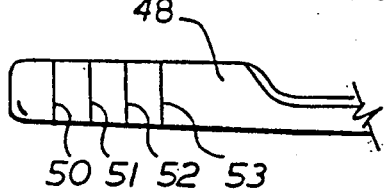
FIG. 9 is an isometric view of a lamella having weakened sections.
Figure 8:
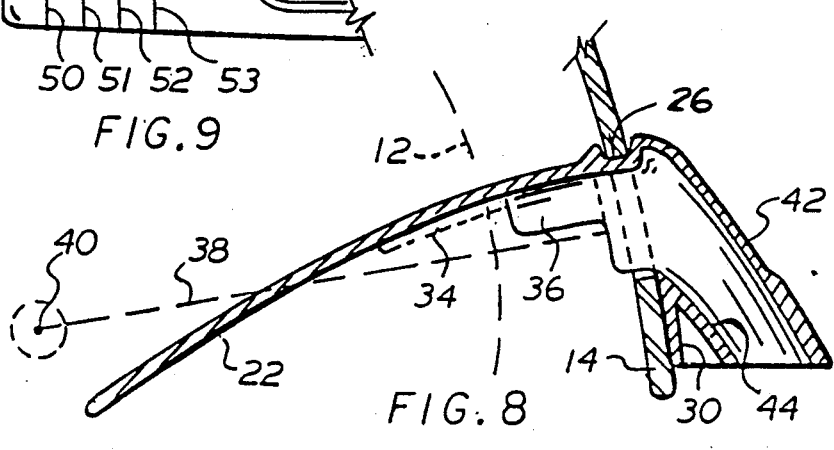
FIG. 8 is a cross-sectional view of the deflector along line 8—8 of FIG. 5.

FIG. 9 shows a different embodiment of a lamella 48 having weakened sections 50-53. It is possible to break the lamella 48 along any of these lines 50-53 so that the length of the lamella will correspond to the length of the radius of the blade 12 used. Such weakened lines must, nevertheless, remain sufficiently strong as not to hinder the normal operation of the air deflector.

I claim:

1. An air deflector adapted to be mounted on a blade protector of a circular saw having a circular blade for projecting air on a location forward to a working portion of the circular saw, said circular saw being provided with a circular blade, said blade protector having an aperture therethrough, said deflector comprising a lamella laterally adapted to extend along the side of the blade between a location adjacent the center of the saw blade and the surface of said protector adjacent said aperture for deflecting air movement produced by the rotation of the blade in the direction of said aperture, an annular member connected to said lamella, said annular member adapted to be fittingly mounted inside said aperture, an arched roof member connected to said annular member for deflecting downwardly said air passing through said aperture, in a location in front of the blade, and means for retaining said annular member in said aperture.

2. An air deflector as recited in claim 1, wherein the lamella extends between the blade protector and a location adjacent the periphery of the blade.

3. An air deflector as recited in claim 2, wherein said annular member has a shape corresponding to said aperture with an open portion at its lower end.

4. An air deflector as recited in claim 3, wherein said annular member is provided with peripheral protuberances for allowing a snaping action of said annular member in said opening.

5. An air deflector as recited in claim 1, wherein the lamella laterally extends along a side of the blade.

6. An air deflector as recited in claim 5, wherein the lamella crosses a radial line extending between the center of the blade and the aperture.

7. An air deflector as recited in claim 5, wherein said lamella has a lateral air guiding member downwardly extending on its side opposite the blade.

8. An air deflector as recited in claim 5, wherein said lamella has a plurality of transversal weakened sections for facilitating the reduction of length of the lamella according to the raduis of the blade.

9. An air deflector as recited in claim 1, wherein the arched roof member has a peripheral wall extending around said aperture and abutting against said blade protector for resting said roof member on said blade protector.

10. An air deflector as recited in claim 1, wherein said arched roof member has two lateral wing members extending from said peripheral wall and adapted to rest on each side of the blade protector.

11. An air deflector as recited in claim 10, wherein said wing members are angularly disposed for adjustably fitting on said blade protector.

12. A circular saw having a circular blade and blade protector, said blade protector having an aperture therethrough, said saw comprising an air deflector secured on said blade protector, said air deflector having a lamella laterally extending along a side of the circular blade between a location adjacent the center of the blade and the aperture of said protector, said lamella adapted to deflect air movement produced by the rotation of the circular saw in the direction of said aperture, an arched roof member fixed on said protector on the side of the protector opposite said lamella, said roof member being disposed over said aperture and adapted to deflect downwardly air passing through said aperture, in a location in front of the blade.

* * * * *